United States Patent
Rodriguez Izal et al.

(10) Patent No.: US 12,355,386 B2
(45) Date of Patent: Jul. 8, 2025

(54) CONTROL OF A DOUBLY-FED INDUCTION MACHINE

(71) Applicant: Siemens Gamesa Renewable Energy Innovation & Technology S.L., Sarriguren (ES)

(72) Inventors: José Luis Rodriguez Izal, Burlada (ES); Estanislao Pablo Tomey Lopez, Navarra (ES)

(73) Assignee: SIEMENS GAMESA RENEWABLE ENERGY INNOVATION & TECHNOLOGY S.L., Sarriguren (ES)

(*) Notice: Subject to any disclaimer, the term of this patent is extended or adjusted under 35 U.S.C. 154(b) by 0 days.

(21) Appl. No.: 18/281,824

(22) PCT Filed: Mar. 2, 2022

(86) PCT No.: PCT/EP2022/055263
§ 371 (c)(1),
(2) Date: Sep. 13, 2023

(87) PCT Pub. No.: WO2022/200005
PCT Pub. Date: Sep. 29, 2022

(65) Prior Publication Data
US 2024/0313678 A1  Sep. 19, 2024

(30) Foreign Application Priority Data
Mar. 24, 2021  (EP) .................................. 21382236

(51) Int. Cl.
*H02P 9/00* (2006.01)
*F03D 9/25* (2016.01)
(Continued)

(52) U.S. Cl.
CPC ............... *H02P 9/008* (2013.01); *F03D 9/25* (2016.05); *H02P 9/007* (2013.01);
(Continued)

(58) Field of Classification Search
CPC ...... H02P 9/007; H02P 9/008; H02P 2101/15; H02P 2103/10; F03D 9/25; F05B 2220/706
See application file for complete search history.

(56) References Cited

U.S. PATENT DOCUMENTS 10,700,583 B2 * 6/2020 Knight .................... H02K 17/32
11,411,521 B2 * 8/2022 Zhou ................. G01R 19/16571
(Continued)

FOREIGN PATENT DOCUMENTS

CN  103 427 508 A  12/2013
WO  2012/059109 A2  5/2012

OTHER PUBLICATIONS

International Search Report & Written Opinion for PCT/EP2022/055263 issued on Jun. 13, 2022.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A method of controlling the operation of a doubly fed induction machine is provided. The DFIM includes a stator electrically coupled to a power grid and a rotor rotating with a rotational speed. The DFIM has a synchronous rotational speed of the rotor and a rated rotational speed of the rotor. Rotation of the rotor at the synchronous rotational speed generates one or more slot harmonic distortions having a harmonic order. The method comprises operating the DFIM at the rated rotational speed of the rotor, wherein the rated rotational speed of the rotor is set to a value selected such that a shift of the harmonic order of one or more of the slot
(Continued)

harmonic distortions at the rated rotational speed of the rotor is an integer number or is within a predefined limit of an integer number.

14 Claims, 11 Drawing Sheets

(51) Int. Cl.
 *H02P 101/15* (2016.01)
 *H02P 103/10* (2016.01)
(52) U.S. Cl.
 CPC .... *F05B 2220/706* (2013.01); *H02P 2101/15* (2015.01); *H02P 2103/10* (2015.01)

(56) References Cited

U.S. PATENT DOCUMENTS

| | | | |
|---|---|---|---|
| 11,476,786 B2* | 10/2022 | Toliyat | H02K 17/26 |
| 2003/0065634 A1 | 4/2003 | Parlos et al. | |
| 2011/0042965 A1 | 2/2011 | Kais et al. | |
| 2012/0056602 A1 | 3/2012 | Li et al. | |
| 2018/0062490 A1* | 3/2018 | Knight | H02K 17/32 |
| 2021/0336574 A1* | 10/2021 | Toliyat | H02P 25/20 |
| 2022/0123680 A1* | 4/2022 | Zhou | H02P 25/062 |
| 2023/0057924 A1* | 2/2023 | Ali | H02P 21/18 |
| 2024/0133954 A1* | 4/2024 | Liu | H02P 29/024 |
| 2024/0162796 A1* | 5/2024 | Jensen | H02K 1/246 |

OTHER PUBLICATIONS

Silva Wilton Lacerda et al: "Speed Estimation of an Induction Motor Operating in the Nonstationary Mode by Using Rotor Slot Harmonics", IEEE Transactions on Instrumentation and Measurement, IEEE Service Center, Piscataway, NJ, US, vol. 64, No. 4, Apr. 1, 2015 (Apr. 1, 2015), pp. 984-994.

* cited by examiner

CONTROL OF A DOUBLY-FED INDUCTION MACHINE

CROSS-REFERENCE TO RELATED APPLICATIONS

This application claims priority to PCT Application No. PCT/EP2022/055263, having a filing date of Mar. 2, 2022, which claims priority to European Application No. 21382236.4, having a filing date of Mar. 24, 2021, the entire contents both of which are hereby incorporated by reference.

FIELD OF TECHNOLOGY

The following relates to a method of controlling the operation of a doubly-fed induction machine (DFIM), in particular when operated in a wind turbine. The following further relates to a respective control system, to a wind turbine and to a computer program.

BACKGROUND

Variable speed wind turbines comprise a generator that converts mechanical power provided by the rotating shaft of the wind turbine rotor into electrical power, the frequency of which is adjusted to the grid frequency by an electrical power converter. For example, a wind turbine can be equipped with a doubly-fed induction generator (DFIG), the stator of which is directly connected to the power grid and the rotor of which is connected to a power converter that controls the rotor currents. The rotor field of the rotating rotor is in particular controlled such that the electrical power induced in the stator windings is synchronous to the grid frequency. Such configuration has the advantage that only a fraction of the generated electrical power needs to be converted by the power converter.

In such type of electric machine, slot harmonic distortions can be generated, which are for example due to the disturbance of the air gap flux by the slots of the rotor, in which the rotor windings are arranged. Such distortions include both harmonic and inter-harmonic distortions, which degrade the power quality of the electrical power generated by the wind turbine. Generally, strict limits are set by grid operators for harmonic and inter-harmonic emission, wherein the limits for inter-harmonic distortions are even lower than those for harmonic distortions.

To deal with such harmonic and inter-harmonic distortions, several mitigation techniques are known. Standard harmonic cancellation in respective electrical machines may for example include the adjustment of stator and rotor number of slots, pitch shortening and slot skewing. Furthermore, tuned filters and active inter-harmonic cancellation devices are employed to reduce the harmonic and inter-harmonic distortions and to keep them below the limits set by the grid regulatory requirements. However, such modifications and mitigation measures may require additional resources in terms of hardware or software and may furthermore increase the costs for the generator and the additional equipment. In particular, additional filters or active cancellation systems are cost-intensive and constitute additional devices that need to be operated. It is desirable to reduce the emissions of respective distortions and to do so in a cost-efficient and resource-efficient way.

SUMMARY

An aspect relates to an improved mitigation of distortions caused by the operation of a DFI machine.

According to an embodiment of the invention, a method of controlling the operation of a doubly-fed induction machine (DFIM) is provided. The DFIM includes a stator electrically coupled to a power grid and a rotor rotating with a rotational speed. The DFIM has a synchronous rotational speed of the rotor and a rated rotational speed of the rotor (which may be higher than the synchronous rotational speed). The rotation of the rotor at the synchronous rotational speed generates one or more slot harmonic distortions having a harmonic order. In embodiments, the method comprises operating the DFIM at the rated rotational speed of the rotor, wherein the rated rotational speed of the rotor is set to a value selected such that a shift of the harmonic order of one or more of the slot harmonic distortions at the rated rotational speed of the rotor is an integer number or is within a predefined limit of an integer number.

Accordingly, by selecting the rated rotational speed, such that the harmonic distortions are shifted by an integer number, reduced or even no inter-harmonic distortions may be generated. By avoiding the generation of inter-harmonic distortions, the need for harmonic filters or active cancellation devices can be reduced, or such devices may not be needed at all. Harmonic distortions, which still occur at the rated rotational speed, can be mitigated more easily, for example by employing standard methods such as slot skewing or the like. Furthermore, the limits set by grid operators for the emission of harmonic distortions are significantly higher than for inter-harmonic distortions, so that the remaining amount of harmonic distortions can be provided into the power grid without additional filtering. As the inter-harmonic distortions are avoided by selecting the rated rotational speed at the specific values, the solution can be implemented at minimal costs, while achieving significant benefits. It has in particular been found that the remaining harmonic distortions are low enough so that no cancellation techniques may be necessary at all.

It should be clear that by defining the shift of the harmonic order to be an integer, i.e., that the distortions are shifted by a full harmonic order or a multiple thereof, the rated rotational speed is defined to correspond to particular discrete values. There is accordingly still flexibility regarding to the value to which the rated rotational speed is set: however, it is not set to any arbitrary value. Rather, the condition that the shift of the harmonic order is an integer number allows the deriving of respective possible (discrete) speed values for the rated rotational speed of the rotor. By such method, the rated speed is set such that inter-harmonic distortions due to the rotor slots are mitigated or even avoided, i.e., that distortions generated by the rotor slots are mainly harmonic distortions. It should further be clear that the shift refers to a shift with respect to the order at synchronous rotational speed.

An integer number can be positive or negative, i.e., ±1, ±2, . . . . It should be clear that, as the system is a physical system, the shift may not correspond to 100% of a full order, but to approximately a full order. Such deviations due to the physical nature of the system are considered to be implied in the term "integer number". Within a predefined limit of an integer number may for example refer to a limit of ±10%, ±5%, ±3%, ±1%, or ±0.1% of an integer number. It should further be clear that as there is a shift of the harmonic order, the integer number is not zero. Also, it should be clear that the rated rotational speed can be larger or smaller than, but not equal to the synchronous rotational speed, as there is a shift of the order of the harmonic distortion(s).

In an embodiment, the integer number by which the order of the harmonic distortions is shifted is an even number. At the synchronous rotational speed, the order of the harmonic disturbances is generally an odd number, so that by shifting the order by an even number, the resulting order is again odd. The acceptance limits for odd order harmonic distortions are generally higher than those for even order harmonics, so that additional compensation equipment or additional compensation measures may not be required when shifting the order by an even integer. However, other implementations may also include the shifting of the order by an odd integer.

In an embodiment, the order of plural or of all of the slot harmonic distortions present at the synchronous rotational speed of the rotor is shifted by an integer number when the rotor of the DFIM is operated at the rated rotational speed.

The doubly-fed induction machine (DFIM) is a doubly-fed induction generator (DFIG), but may also be a motor. The DFIM is a 3 phase DFIM, and it has a pole pair number of 1, 2, 3 or more.

For a DFIM, the synchronous rotational speed generally depends on the power grid frequency. For a generator, the synchronous rotational speed may for example be the rotational speed of the rotor at which, when the rotor currents are set to DC currents, the DFIM generates the grid frequency (e.g., 50 Hz or 60 Hz).

Operation of the DFIM at the rated speed may in particular refer to the operation in an operating mode in which the rotor speed is kept constant at the rated rotational speed. It is a speed at which the DFIM is configured to operate during normal operation, e.g., for prolonged periods of time. For example, for a DFIG, at the rated speed, the rotor speed does not further increase for a further increase in active electric power generation by the DFIM. With respect to a wind turbine, this may for example mean that above a certain wind speed or torque, the rated rotational speed of the generator is reached, whereafter the generator speed is kept constant for higher wind speeds or torques. At intermediate wind speeds below such wind speeds, the generator may be operated in a second operational mode in which the generator speed varies below the rated rotational speed. However, at such varying rotational speed, inter-harmonic distortions are not generated at respective fixed frequency values, but rather at changing frequencies, so that there are no high amplitudes for specific inter-harmonic distortions (they are rather spread out over a wider frequency spectrum). Accordingly, in such operating mode, the problem of inter-harmonic distortions does not exist or is at least not as prominent as for operation at the rated rotational speed.

In an exemplary implementation, the slip of the rotor may be defined in dependence on a difference between the synchronous rotational speed of the rotor and the (actual) rotational speed of the rotor. The rated rotational speed of the rotor can then be set by setting the slip at the rated rotational speed of the rotor to a predetermined value. The slip s may for example be defined as $s=1-(n_{rot}/n_{synch})$, wherein $n_{rot}$ is the rotational speed of the rotor and $n_{synch}$ is the synchronous rotational speed.

The slip at the rated rotational speed of the rotor may for example be set to an integer multiple of a predetermined fraction, wherein the predetermined fraction is determined by a symmetry of the rotor. Again, an integer multiple may for example be ±1, ±2, . . . , i.e., positive or negative slip values are possible. The rated rotational speed of the rotor correspond to a negative slip value, so that the rotor rotates faster than the synchronous rotational speed. A respective fraction is in particular one divided by an integer number.

As an example, the rotor may have a rotational symmetry so that by rotation about a predetermined rotational angle, which corresponds to a symmetry unit of the rotor, the rotor reaches a corresponding physical state (i.e., that corresponds to the initial state).

The predetermined fraction F may for example correspond to $F=1/(2*m)$, wherein m is the number of phases of the DFIM rotor, if the number of phases of the rotor is odd. If the number of phases of the rotor of the DFIM is even, the predetermined fraction may correspond to $1/m$. This may in particular apply to a conventionally wound rotor of the DFIM (winding of one phase per slot).

Other rotor configurations are certainly conceivable. For example, the DFIM may have concentrated windings or coils, wherein windings of two phases may for example be provided in a slot (e.g., one coil per tooth). For a concentrated winding DFIM, the fraction may be $F=p/Q$, wherein Q is the total number of concentrated coils of the rotor and p is the number of pole pairs of the rotor. When the windings of two phases are provided per slot, then Q may be equal to the total number of slots. As a further example, the DFIM may have fractional rotor windings, and the predetermined fraction may be $F=p/R$, wherein p is the number of pole pairs of the rotor and R is the remainder of a division between Z and $(2*p*m)$, wherein Z is the total number of slots of the rotor, p is the number of pole pairs of the rotor and m is the number of phases of the rotor.

For example, for a three-phase machine (conventionally wound rotor), m is odd and the predetermined fraction is thus ⅙. It should however be clear that for different configurations of the DFIM, for example for a different number of phases or for a different slot configuration, the predetermined fraction may be different from ⅙.

The rated rotational speed of the rotor may in particular be set to a value of $n_r=60(1\pm k*F)*f/p$ in units of rpm (revolutions per minute), wherein k is an integer number, F is the predetermined fraction (e.g., m=3; $F=1/(2*m)$, e.g., ⅙), f is the grid frequency and p is the number of pole pairs. As indicated above, for other rotor types or a different number of phases, the fraction F may have a value different from ⅙.

The slip may in particular be selected such that after an electrical period of the stator (e.g., stator voltage period), the rotor is in a state in which the magnetic field of the rotor experienced by the stator corresponds (i.e., is (substantially) equal) to the magnetic field of the rotor at the start of the electrical period, irrespective of its sign (i.e., there may be a phase shift of 0 or 180 degrees, i.e., the rotor currents causing the magnetic field may be (substantially) the same or reversed).

The rated rotational speed of the rotor may be a maximum rated rotational speed of the rotor (i.e., the highest speed at which the DFIM is operated continuously or for prolonged periods of time: there may certainly be dynamic excursions around the rated speed). The DFIM may in particular be controlled so that upon reaching the rated rotational speed, the rotational speed of the rotor is kept at the rated rotational speed, also when the active electrical power output of the DFIM increases. The rated rotational speed may thus correspond to a fixed upper speed limit, which may be reached upon the DFIM receiving a predetermined mechanical torque, and the rotational speed may be kept constant at the rated speed at higher received mechanical torques.

In an embodiment, the DFIM, in particular a DFIG, further has a connection rotational speed at which the DFIM starts outputting electrical power towards the power grid. In embodiments, the method further comprises setting the connection rotational speed of the rotor to a value selected such that a shift of the harmonic order of one or more of the slot harmonic distortions at the connection rotational speed of the rotor is an integer number or is a predefined limit of an integer number. The features and advantages described herein above and further below with respect to the setting of the rated rotational speed apply correspondingly to the setting of the connection rotational speed, e.g., use of the above indicated predetermined fraction or the respective formula for determining the setting for the connection rotational speed. The connection rotational speed may in particular be a minimum speed at which power is produced and/or provided to the grid. Upon reaching the connection rotational speed, the DFIM may for example start providing an output of active electrical power, and the rotational speed of the rotor may be kept constant until a certain active power output from the DFIM is reached. As such, the connection rotational speed may also be considered to be a lower rated rotational speed of the DFIM (i.e., the lowest speed at which the DFIM is operated continuously or for prolonged periods of time: there may certainly be dynamic excursions around the lower rated rotational speed). Above such active power limit, the rotational speed of the DFIM may be allowed to increase, until it reaches the upper (maximum) rated rotational speed.

The operating curve of the DFIM may accordingly comprise three sections, in particular operation at the connection rotational speed, operation at the (maximum) rated operational speed, and operation at variable speed between the connection rotational speed and the rated operational speed. Inter-harmonic distortions can thus be reduced significantly or may even be avoided at the connection rotational speed and at the rated rotational speed. As indicated above, inter-harmonic distortions are only generated with low amplitude when the DFIM speed varies.

In an embodiment, the DFIM has a slot skew of one or more slots, in particular of an integer number of slots, of one slot. By such slot skew, slot harmonic distortions can be reduced significantly. In particular, higher order harmonic distortions can be reduced to a value so that they are hardly noticeable. Slot skew has, however, not that much effect on inter-harmonic distortions. Accordingly, by shifting the distortions to harmonic distortions using the setting of the rated rotational speed and applying slot skew, the total distortions emitted by the DFIM can be reduced significantly.

In an embodiment, the method further comprises operating the DFIM in a noise-reduction mode of operation in which the rated rotational speed is reduced to a second rated rotational speed, and setting the second rated rotational speed of the rotor to a value selected such that a shift of the harmonic order of one or more of the slot harmonic distortions at the second rated rotational speed of the rotor is an integer number or is within a predefined limit of an integer number. The solution described herein may thus also be applied to other rated rotational speed settings of the rotor, such as for a respective noise-reduction mode. Consequently, also when operating in such mode with a reduced but still constant operational speed, the inter-harmonic emissions of the DFIM can be reduced significantly.

The DFIM may for example be a DFIG that forms part of an electrical power system of a wind turbine. The rotor of the DFIG may for example be mechanically coupled to a wind turbine rotor to receive rotational mechanical energy from the wind turbine rotor (for example by a direct coupling or by a coupling via a gearbox). The wind turbine may then emit significantly less inter-harmonic distortions into the power grid.

According to a further embodiment of the invention, a control system for controlling the operation of a doubly-fed induction machine is provided. The DFIM includes a stator configured to be electrically coupled to a power grid and a rotor configured to rotate with a rotational speed, wherein the DFIM has a synchronous rotational speed of the rotor and a rated rotational speed of the rotor. Rotation of the rotor at the synchronous rotational speed generates slot harmonic distortions having a harmonic order. The control system is configured to perform the step of operating the DFIM at the rated rotational speed of the rotor, wherein the rated rotational speed of the rotor is selected such that a shift of the harmonic order of one or more of the slot harmonic distortions at the rated rotational speed of the rotor is an integer number or is within a predefined limit of an integer number. By such control system, advantages similar to the ones outlined further above with respect to the method may be achieved. It should be clear that the shift occurs with respect to the order of the slot harmonic distortions at the synchronous rotational speed.

The control system may be configured to perform the method according to any of the embodiments disclosed herein, it may in particular be configured to perform any of the disclosed method steps. In embodiments, the method may be performed by a respective control system having any of the configurations described herein.

According to a further embodiment of the invention, a wind turbine comprising a doubly-fed induction machine, in particular a DFIG, and a control system having any of the configurations described herein is provided. The control system is coupled to the DFIM to control the operation for the DFIM. It should be clear that although the description provided herein mainly relates to the operation of the DFIM within the context of a wind turbine, the respective method and control system are also applicable in other operating environments, such as for example for operating motors in mines, mills, conveyors, in the paper industry, and the like. It is however desired that the doubly-fed induction machine is a DFIG.

A further embodiment of the invention provides a computer program product (non-transitory computer readable storage medium having instructions, which when executed by a processor, perform actions) for controlling the operation of a DFIM, wherein the computer program comprises control instructions which, when executed by a processing unit of a control system that controls the operation of the DFIM, cause the processing unit to perform any of the methods disclosed herein. Again, by such computer program, advantages similar to the ones outlined further above may be achieved. The computer program, in particular the respective control instructions, may be provided on a volatile or non-volatile data carrier or storage medium.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
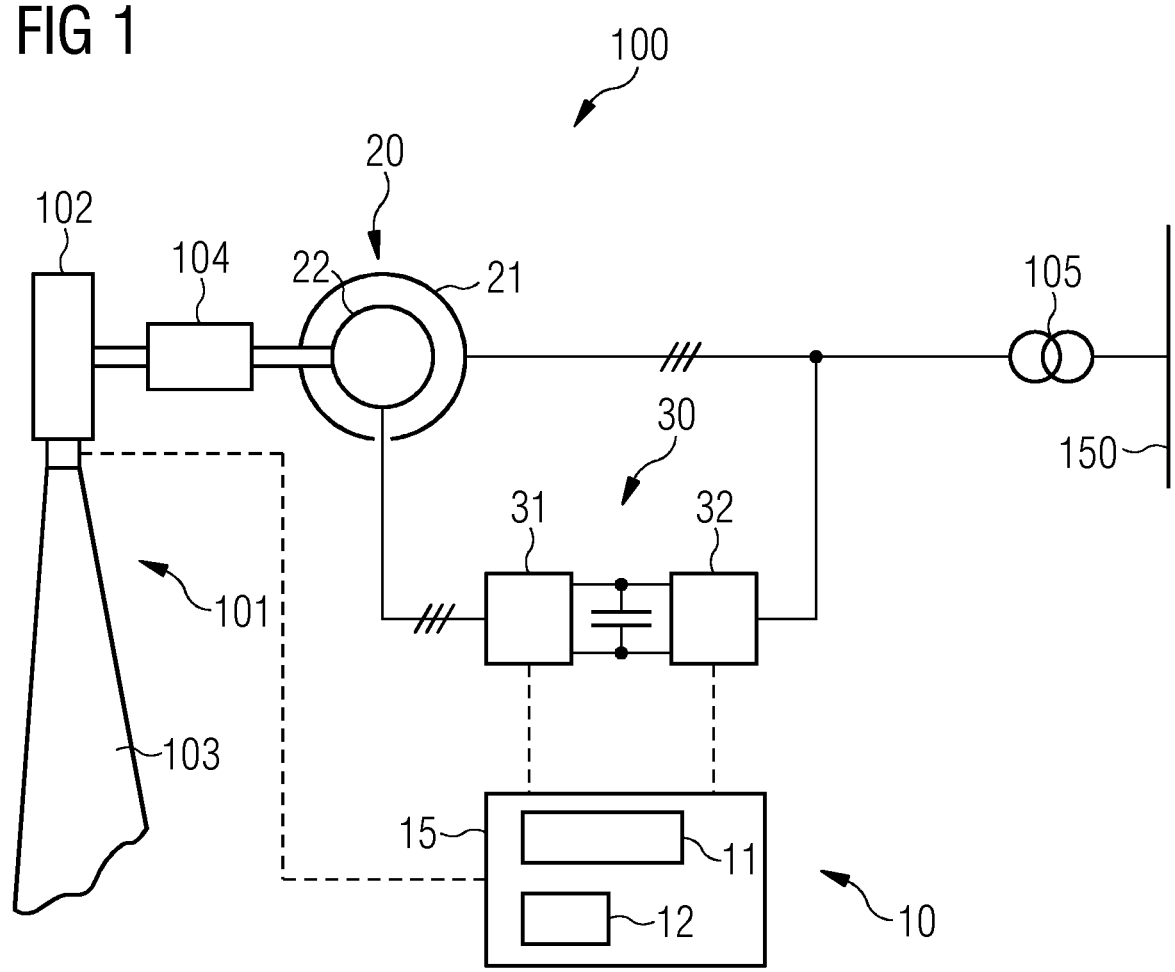
FIG. 1 is a schematic drawing showing a doubly fed induction machine and a control system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

In the following, examples are described with respect to a DFIM in form of a DFIG of a wind turbine. It should however be clear that the solutions disclosed herein are also applicable to other types of DFIMs, such as doubly-fed electric motors, and to doubly-fed induction generators in other applications.

FIG. 1 schematically illustrates a control system 10 according to an embodiment. Control system 10 is coupled to or forms part of a wind turbine 100 that includes a wind turbine rotor 101 with a hub 102 and rotor blades 103. Via respective shafts and a gearbox 104, the wind turbine rotor is mechanically coupled to a doubly-fed induction generator 20, in particular to a rotor 22 of DFIG 20. DFIG 20 further includes a stator 21 that is electrically coupled to the power grid 150, in particular via a wind turbine transformer 105. Power grid 150 may for example be a local wind farm grid or a utility grid or the like. It should be clear that further electric components, such as a sub-station transformer and the like can be provided in the coupling, although the coupling to transformer 105 does generally not include a power converter.

The rotor 22 of DFIG 20 is electrically connected to the electric power converter 30, which includes a generator-side converter 31 and a grid-side converter 32. The connection of the grid side converter 32 to the transformer 105 can be directly or by an additional transformer that adjusts the voltage or by an intermediate power point in the transformer 105. Control system 10 controls the operation of the power converter 30 and in particular of the generator-side converter 31, thereby controlling currents in the rotor 22. Control schemes, such as vector control or direct torque control, can for example be employed. These are commonly known and will thus not be explained in greater detail here. Control system 10 may thus comprise the generator-side converter 31 or the power converter 30.

Control system 10 can be implemented as a controller 15, which may include or may be a converter controller, a wind turbine controller or a combination thereof. Controller 15 in particular includes a processing unit 11 and a memory 12 coupled to the processing unit. Processing unit 11 may include any type of processor, such as a microprocessor, an application specific integrated circuit, a digital signal processor or the like. Memory 12 may include volatile and non-volatile memory, in particular RAM, ROM, flash memory, a hard disk drive and the like. Controller 15 may further include input and output interfaces for receiving data and for transmitting control data or commands to the power converter 30 and other controlled components, such as a blade pitch drive for adjusting the pitching angle of blades 103. Control system 10 is generally configured to control the generator 20 such that electrical power provided by stator 21 to the power grid is synchronous with the grid frequency. Control system 10 further controls the rotational speed and torque of DFIG 20. It is in particular configured to control the DFIG 20 in accordance with an operating curve, an example of which is illustrated in FIG. 2.

Figure 2:
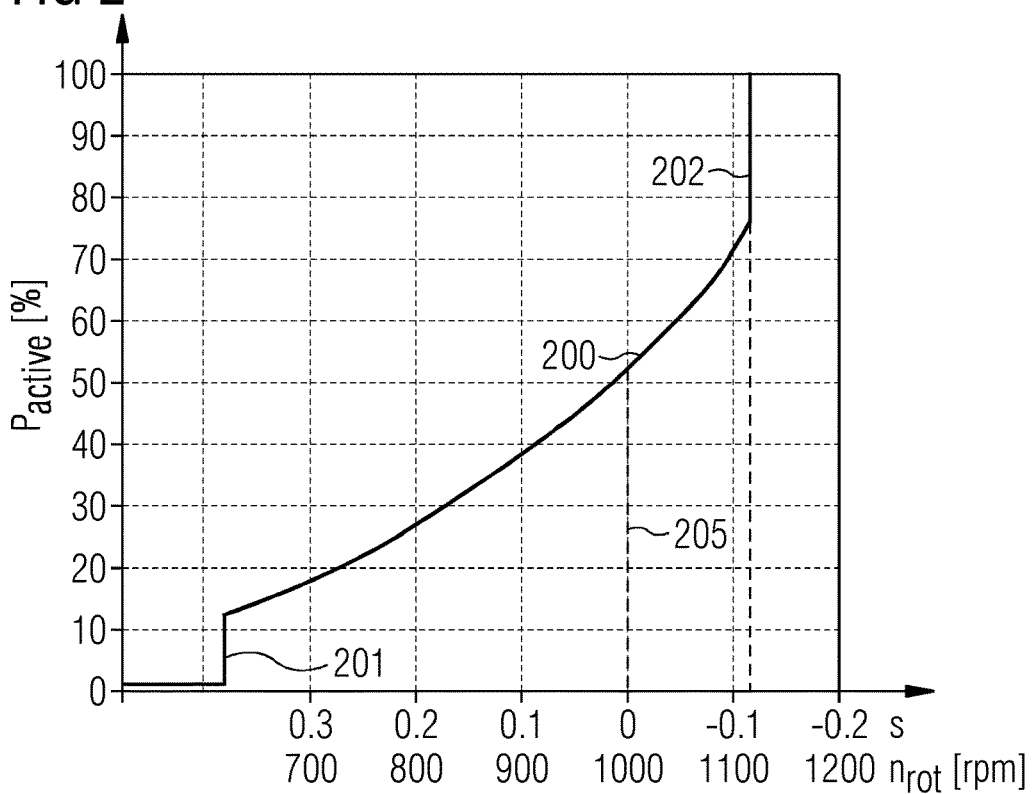
FIG. 2 is a schematic drawing showing the operating curve of a doubly fed induction generator according to an embodiment of the invention.

FIG. 2 is a diagram illustrating the active power output $P_{active}$ of DFIG 20 in dependence on the rotational speed $n_{rot}$ of the rotor 22, in units of rpm. As can be seen, the rotational speed of the DFIG 20 increases up to a connection speed 201, at which the DFIG 20 starts to produce active electrical power that is provided to the power grid and/or supplies components of the wind turbine. Control system 10 keeps the rotational speed of the generator constant at the connection speed 201 until a certain minimum level of active power generation is reached, corresponding to a minimum level of mechanical energy received from the rotation of the wind turbine rotor 101. In other words, the wind needs to have certain speed before the generator accelerates beyond the connection speed 201. Control system 10 then operates the wind turbine with an optimum tip speed ratio, in particular at a maximum power point setting at which the extraction of mechanical energy from the wind is maximized. With increasing wind speed, or when starting the wind turbine in higher wind conditions, the rotational speed of the generator is then increased along curve 200 while increasing the active power output from DFIG 20. The rotational speed is increased until a (upper or maximum) rated rotational speed 202 is reached. In normal operation, when sufficient wind is available, the DFIG is operated at the rated rotational speed 202. The rated rotational speed 202 is maintained even if the active power output is increased, i.e., as the wind speeds increase further. Above a maximum wind speed, i.e., 100% active power production, other measures are taken to avoid system overload, such as pitching out the rotor blades. In the example of FIG. 2, the rated rotational speed 202 is thus a maximum rotational speed.

The DFIG 20 has a synchronous rotational speed 205, which depends on the DFIG configuration and the grid frequency of power grid 150. At the synchronous rotational speed, the rotor currents in rotor 20 are set to DC, and the electrical power induced in stator 21 is at the grid frequency. By controlling the rotor currents using generator-side converter 31, the DFIG 20 can be operated at rotational speeds above and below the synchronous speed 205. A respective slip s can be defined as $s=1-n_{rot}/n_{sync}$. FIG. 2 illustrates the slip values s for the respective rotational speeds $n_{rot}$ of the DFIG 20, wherein negative slip values correspond to a rotational speed above $n_{sync}$ (super-synchronous or hyper-synchronous operation), whereas positive slip values correspond to an operation below $n_{sync}$ (sub-synchronous operation).

Figure 3:
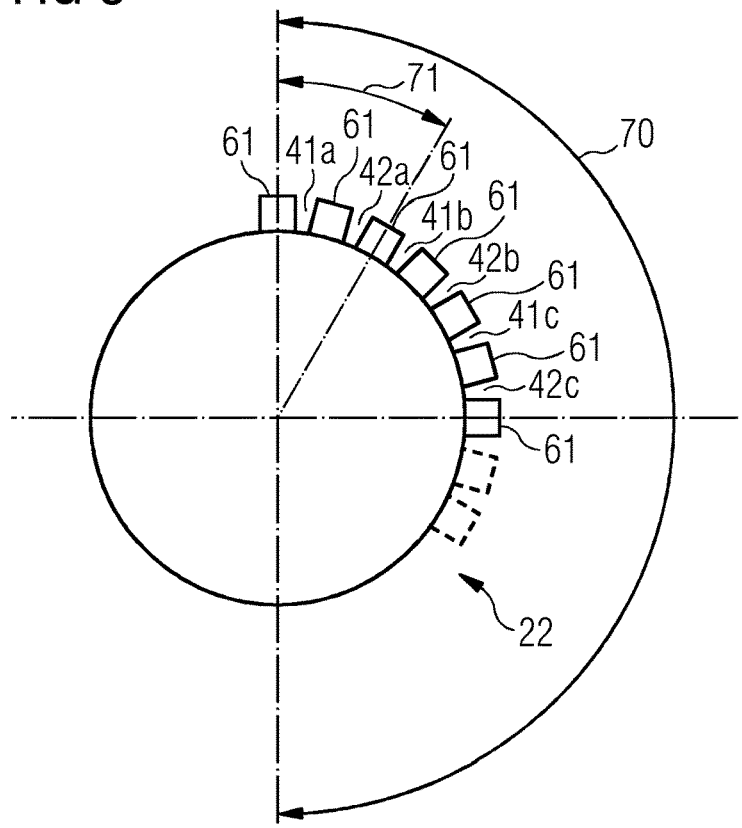
FIG. 3 is a schematic drawing that schematically illustrates the slots of a rotor of a doubly fed induction machine according to an embodiment of the invention.

The rotor 22 of the DFIG 20 has for each phase at least one pole pair, so that for a three-phase system as illustrated in FIG. 1, the rotor comprises at least three slots per pole, and a minimum of 3 slots when using concentrated windings. FIG. 3 schematically illustrates a rotor 22 having a number of poles equal to 4 and a pole pair number p=2 so that such rotor would include 4×6=24 slots and teeth. The slots for a first phase a are the consecutive slots 41a and 42a, for phase b are 41b and 42b, and for phase c are 41c and 42c, which take up the rotor windings. Between the slots, teeth 61 are present. Such rotor accordingly and in synchronism with the stator has a symmetry 70 such that it reaches the same physical state after rotating 360°/p, i.e., 90° for p=4, 120° for p=3 and 180° for p=2. When the number of phases is odd, the m phases divide the symmetry 70) into 2*m fractions when considering positive and negative m-phases symmetry. This fraction is shown as 71 in FIG. 3. When considering the rotor, an m phase system having a flowing current at frequency $(s*f_0)$ and which rotates at a speed $n_{rot}$ different from the synchronous speed $n_{sync}$, the value of slip being $s=1-n_{rot}/n_{sync}$, the symmetry imposes that in a period of the stator, the rotor has to rotate an angle equal to the rotor symmetry unit 70 plus (advancing: super-synchronous or hyper-synchronous operation) or minus (lagging: sub-synchronous operation) an integer number of times the m-phase fraction 71 in order to obtain a shift of the harmonic order by an integer number.

In other words, after an electrical period of the stator (e.g., stator voltage), the slip of the rotor must be such that the stator sees the similar current distribution/magnetic field distribution (it may change sign). For example, for phases u, v, w, in synchronous operation, for an electrical period 2pi of the stator, the rotor rotates 2pi/p. Initially, the rotor position may be at phase u, and after one electrical period, the rotor position will be the next phase u, whereupon the stator experiences the same current/magnetic field. For sub-synchronous operation, in an electrical period 2pi of the stator, the rotor rotates 2pi(1−s) electrical angle, and 2pi(1−s)/p mechanical angle. For an m=3 machine, considering the initial rotor position at phase (u) and current (I), and that the above outlined condition is fulfilled, e.g., s=⅙, the rotor lags an electrical angle 2pi/6, so that after one stator electrical period, the rotor position is the phase (−v) with current (−I), i.e., phase pi. Accordingly, the stator sees the same current in the rotor, so that the shift of the harmonic distortion is an integer order. Similarly, when s=2/6, the rotor lags an electrical angle 4pi/6, the rotor position is at the phase (w) with current (I), i.e., phase 0), and the stator sees again the same current. When s=3/6, the rotor lags an electrical angle 6pi/6, the rotor position is the phase (−u) with current (−I), i.e., phase pi, and the stator sees again the same current. The situation is similar for the super-/hyper-synchronous operation. Assuming the same starting position of the rotor, and a slip of s=−⅙, the rotor overtakes an electrical angle of 2pi/6, so that after one electrical period of the stator, the rotor position is at the phase (−w) with current (−I), i.e., phase −pi. Again, the stator will see the same current in the rotor. This can be continued for integer multiples of this fraction F, e.g., when s=−2/6, then the rotor overtakes an electrical angle 4pi/6, so that the rotor position is at the phase (v) with current (I): when s=−3/6, the rotor overtakes an electrical angle 6pi/6, so that the rotor position is at the phase (−u) with current (−I), and so on.

Consequently, based on the condition of a shift of the order of the slot harmonic distortions by an integer number, the required slip can be derived and thus the rotational speed of the DFIM at which this condition is fulfilled.

Slots 41a, 41b, 41c and 42a, 42b, 42c disturb the air gap flux of the field between rotor 22 and stator 21, which causes distortions that are injected into the power grid 150. As indicated above, grid operators put strict limits on respective distortions. In general, limits are particularly strict for even order harmonic distortions and for inter-harmonic distortions, whereas odd order harmonic distortions are generally more acceptable.

Figure 4:
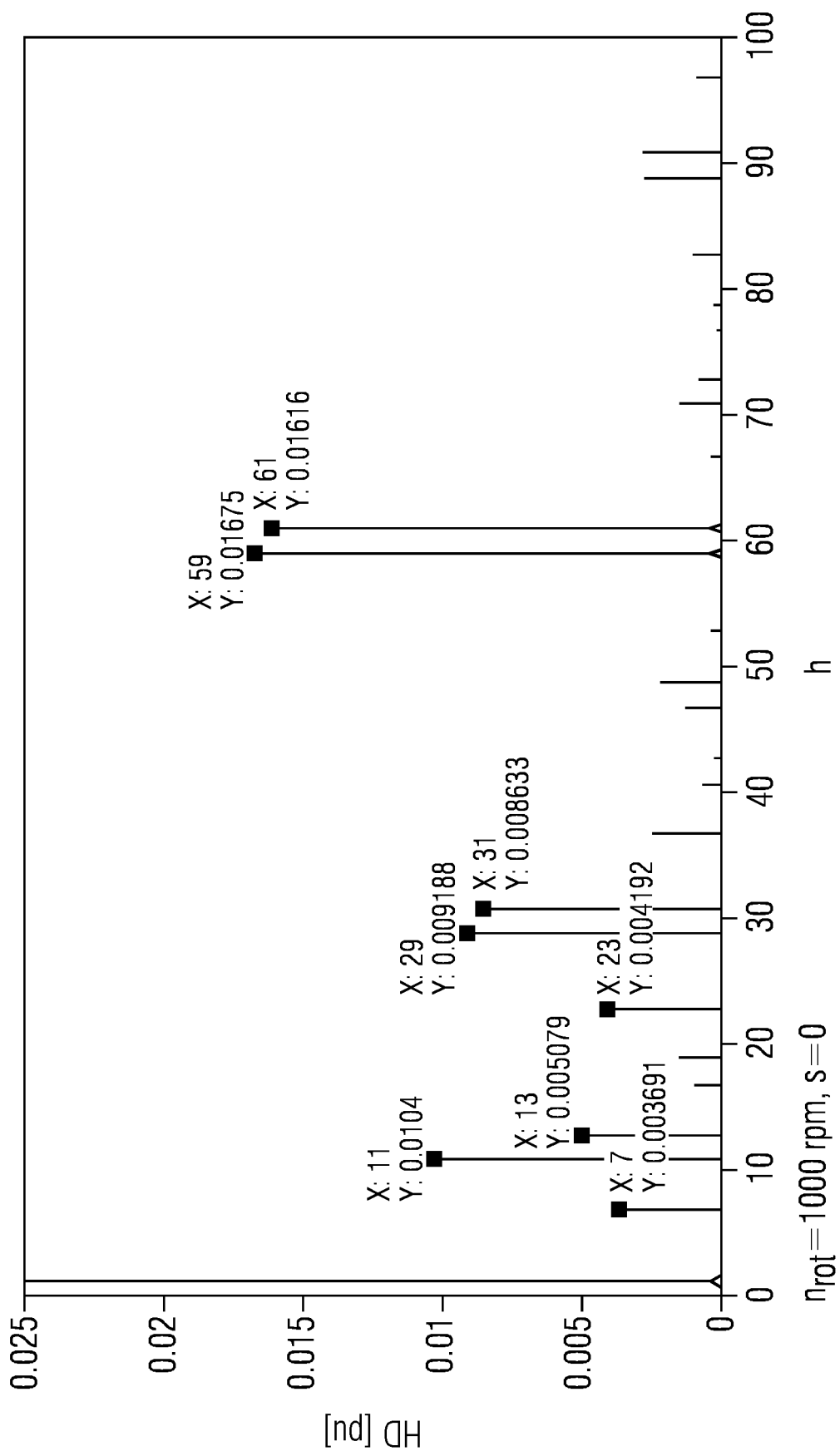
FIG. 4 illustrates an embodiment of a DFIG, which is a 2.5 MW machine operated on a 50 Hz grid, the number of phases is m=3, the harmonic and inter-harmonic distortions at the synchronous rotational speed of 1000 rpm.
Figure 5:
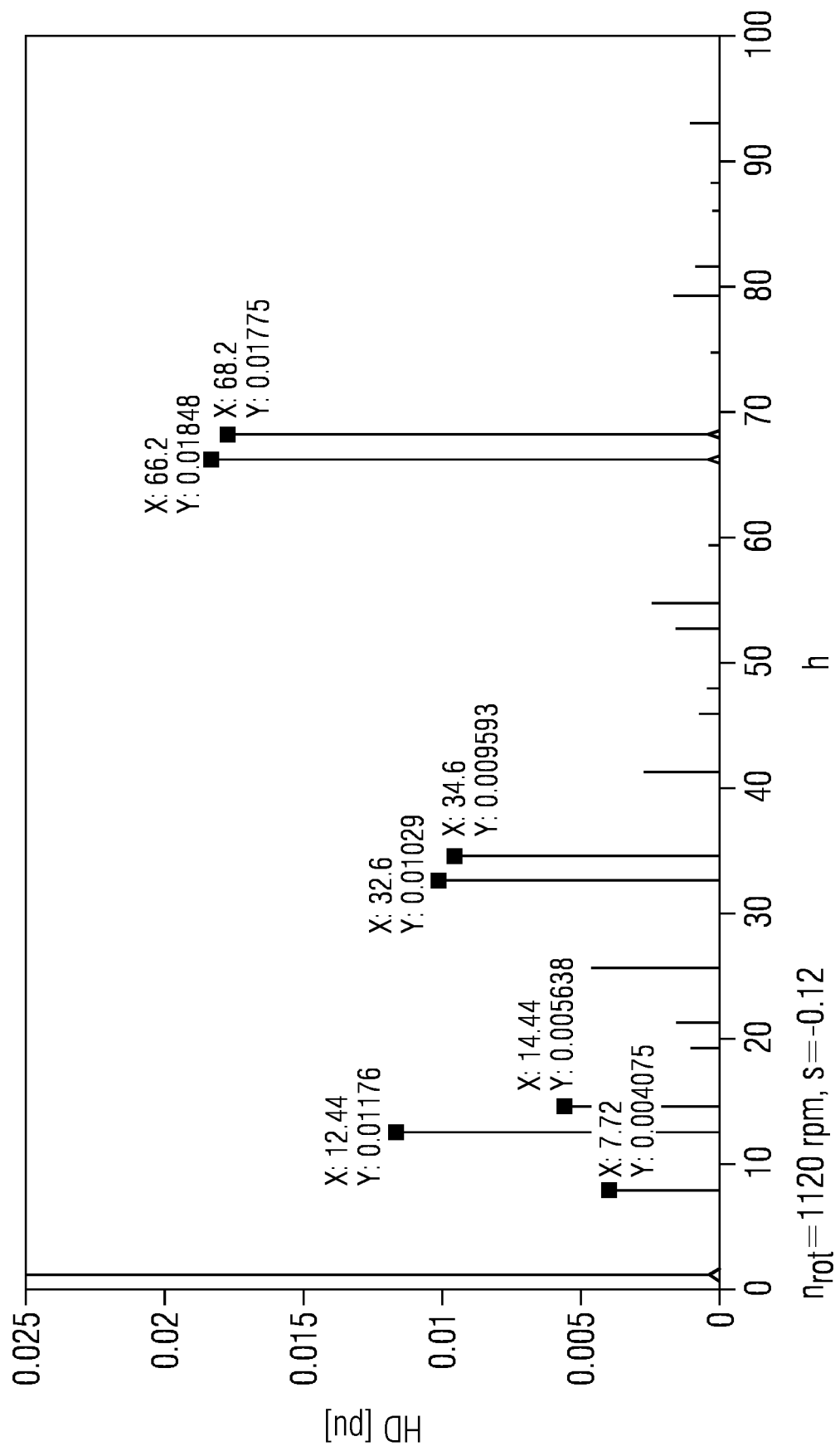
FIG. 5 illustrates inter-harmonic distortions occurring during operation at an arbitrarily selected rated rotational speed.
Figure 6:
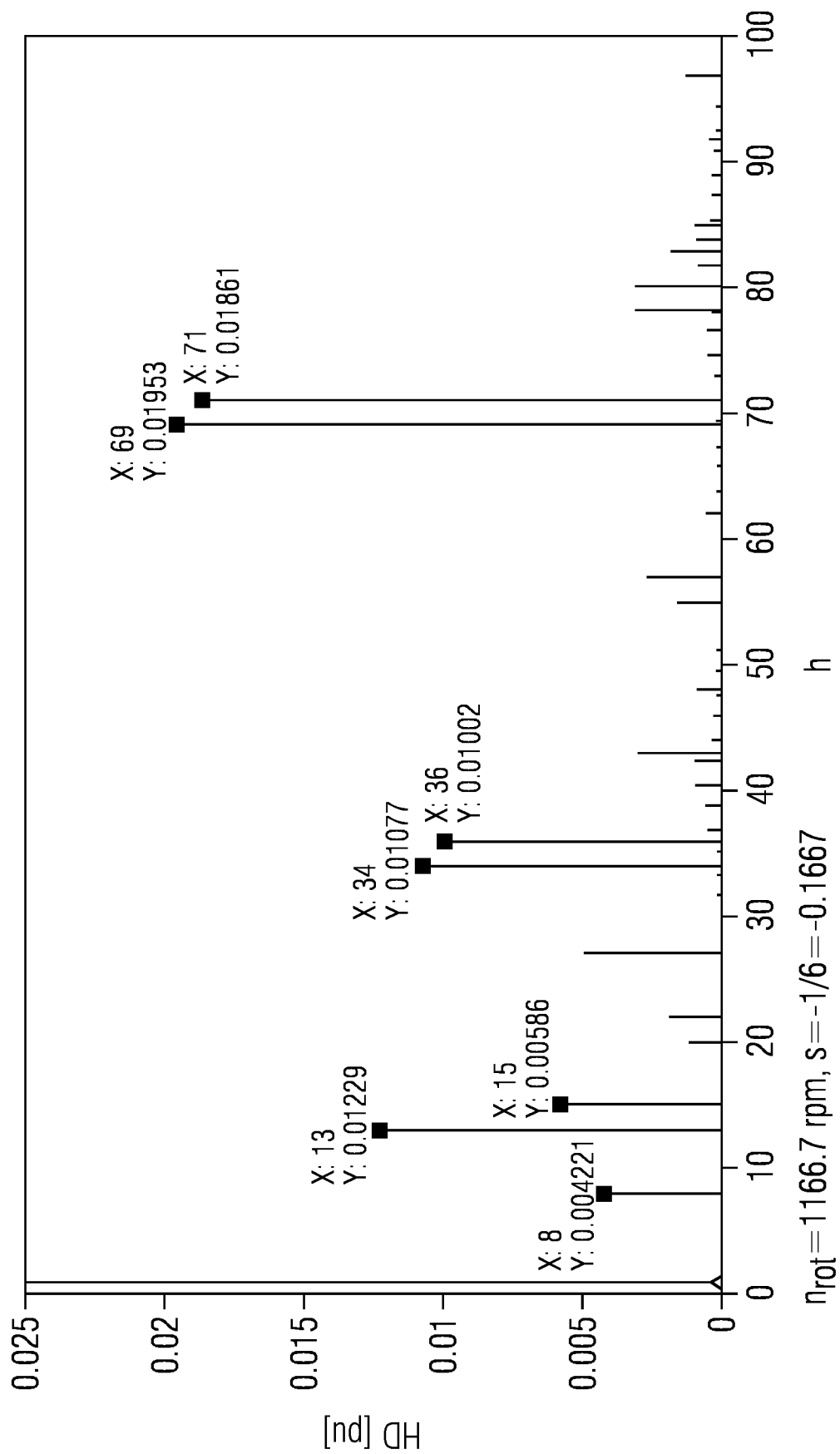
FIG. 6 illustrates harmonic distortions occurring during operation at a rated rotational speed set in accordance with embodiments of the invention.
Figure 7:
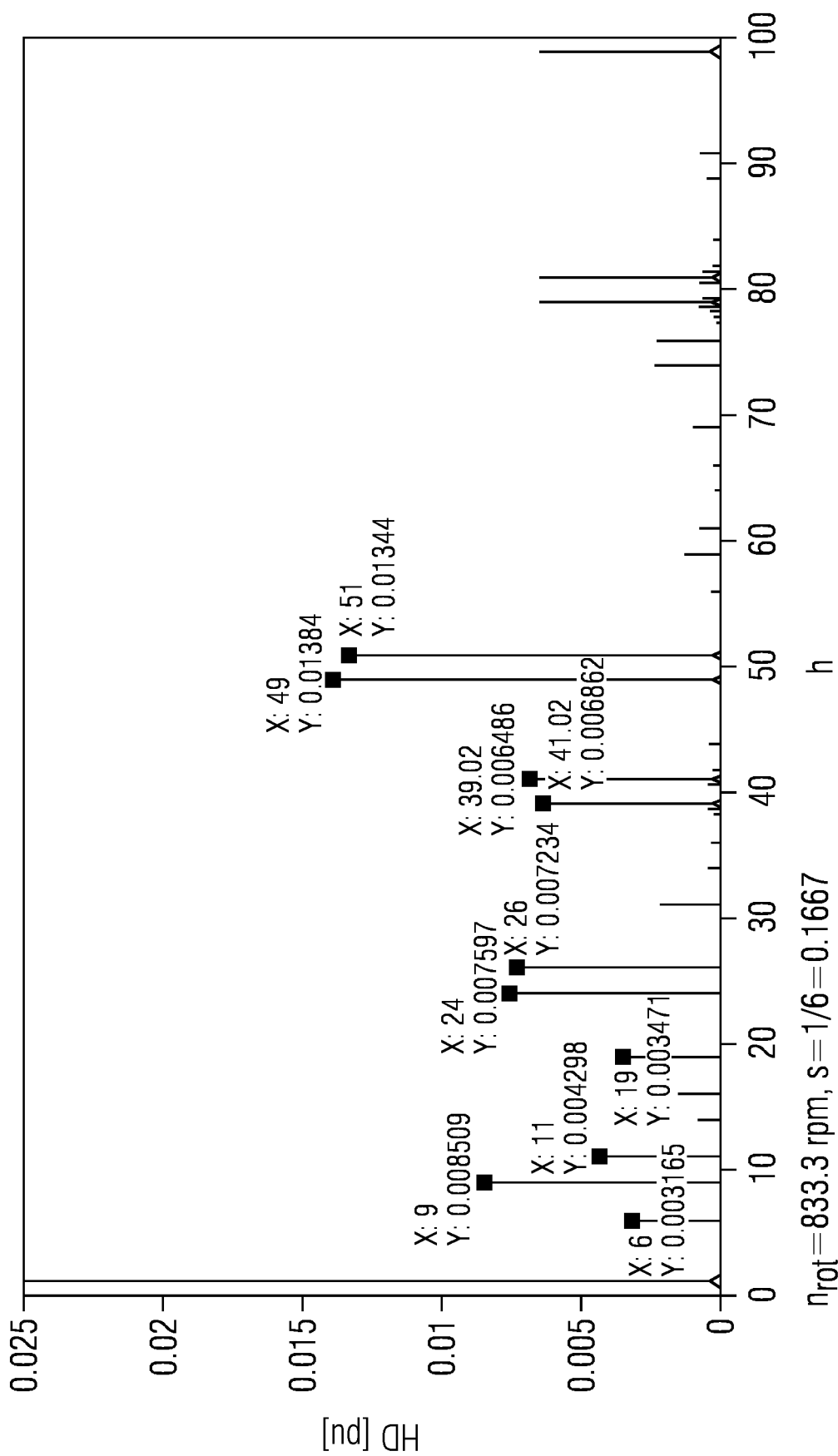
FIG. 7 illustrates harmonic distortions occurring during operation at a rated rotational speed set in accordance with embodiments of the invention.

FIG. 4 illustrates a DFIG 20, which is a 2.5 MW machine operated on a 50 Hz grid, the number of phases is m=3, the harmonic and inter-harmonic distortions at the synchronous rotational speed of 1000 rpm. Value X indicates the harmonic/inter-harmonic order h, and the vertical axis shows the stator voltage harmonic distortion $HD=V_h/V_0$. As can be seen at the synchronous speed with slip=0, the distortions are harmonic distortions of odd integer order. When the rotational speed of the generator 20 is now changed to deviate from the synchronous speed, the slot harmonic distortions are shifted so that inter-harmonic distortions are obtained. This is illustrated in FIG. 5 for the same generator for a slip s=−0.12, corresponding to $n_{rot}$=1120 rpm. As can be seen, the order of the distortions is no longer an integer number, so that all the distortions become inter-harmonic distortions.

In accordance with the solution disclosed herein, the rated rotational speed 202 and in some embodiments the connection rotational speed 201 is now set to a value such that the shift of the order of the harmonic distortions, which occur at the synchronous rotational speed, is an integer number at these speeds 202, 201. Based on such condition, rotational speeds can be identified for which this condition is met, and the rated rotational speed 202 and/or the connection rotational speed 201 can be set to one of these identified values that best meets the operating requirements. As the DFIG 20 operates prolonged periods of time at the rated operational speed 202, such operation in particular suffers from the inter-harmonic distortions that need to be reduced. By a respective setting of the rated operational speed, such inter-harmonic distortions are avoided, so that only harmonic distortions are present. The resulting harmonic distortions may be acceptable to the grid operator, or they may be removed rather easily by conventional mitigation measures, such as slot skewing. Cost-intensive additional equipment for removing inter-harmonic distortions may thus not be required. It should be clear that similar considerations apply for a doubly-fed synchronous machine that is implemented as a motor, i.e., that mainly operates in motor operation, wherein the rated speed for such motor may similarly be set such that the order of the harmonic distortions occurring at the synchronous rotational speed is shifted by an integer number when operating at the rated rotational speed.

The slip of the DFIG 20 or another doubly fed induction machine can be defined by $$s = 1 - n_{rot}/n_{sync} \quad \text{(equation 1)}$$

The synchronous speed $n_{synch}$ is related to the stator frequency f, i.e., the grid frequency, and the pole pair number p of the DFIM by $$n_{sync} = 60 f/p \quad \text{(equation 2)}$$

The rotor of the electrical machine has slots 41a, 42a, 41b, 42b and 41c, 42c in which the conductors of the different phases are located. When the DFIM is magnetized and the rotor is supplied with current having a cosine waveform, the slots introduce harmonic and inter-harmonic distortion in the airgap flux and thus in the stator. The order of the harmonic (or inter-harmonic) is $h=f_h/f_0$, wherein $f_h$ is the frequency of the harmonic or inter-harmonic distortion of order h. If the DFIM is rotated at a speed not equal to the synchronous rotational speed, the slot harmonics are shifted. The shift of the order h of the slot harmonics at a slip s can be expressed by:

$$h(s) = h(0) + s(h(0) \pm i) \quad \text{(equation 3)}$$

wherein h(0) is the order at slip=0, s is the slip and i is an integer number. The term (h(0)±i) depends on the symmetry of the rotor, and in particular on the number of phases. The term is in particular an integer multiple of (2*m) for an odd number of phases, wherein m is the number of phases. For an even number of phases, the term is an integer multiple of m. For a rotor with concentrated windings, the term is an integer multiple of p/Q, wherein Q is the total number of concentrated coils and p the number of pole pairs. For fractional windings of the rotor, the term is a integer multiple of R/p, wherein R is the remainder of the integer division between Z and (2*p*m), wherein Z is the total number of slots, p the number of pole pairs, and m the number of phases of the rotor (i.e., Z=quotient*(2*p*m)+R). For a three-phase machine, m is odd and (h(0)±i) must for example be a multiple of 6. Accordingly, by setting the slip to a fraction F=1/(2*m) (e.g., F=⅙ for a three-phase machine), it can be achieved that the order of the harmonic distortions is shifted by an integer number, i.e., that the order of the slot harmonics remains integer after the shift when operating with slip s. There are accordingly no inter-harmonic distortions when the rotational speed of the machine is selected so that s*(h(0)±i) is integer.

For a three phase machine, when slip is a multiple of ±⅙, there is not inter-harmonic content of the slot distortions. When slip is a multiple of ±⅓, all the harmonics are odd again.

FIGS. 4 to 7 illustrate the shift for a 2.5 MW three phase DFIG and FIGS. 8 to 11 for a 4.5 MW three phase DFIG.

Figure 8:
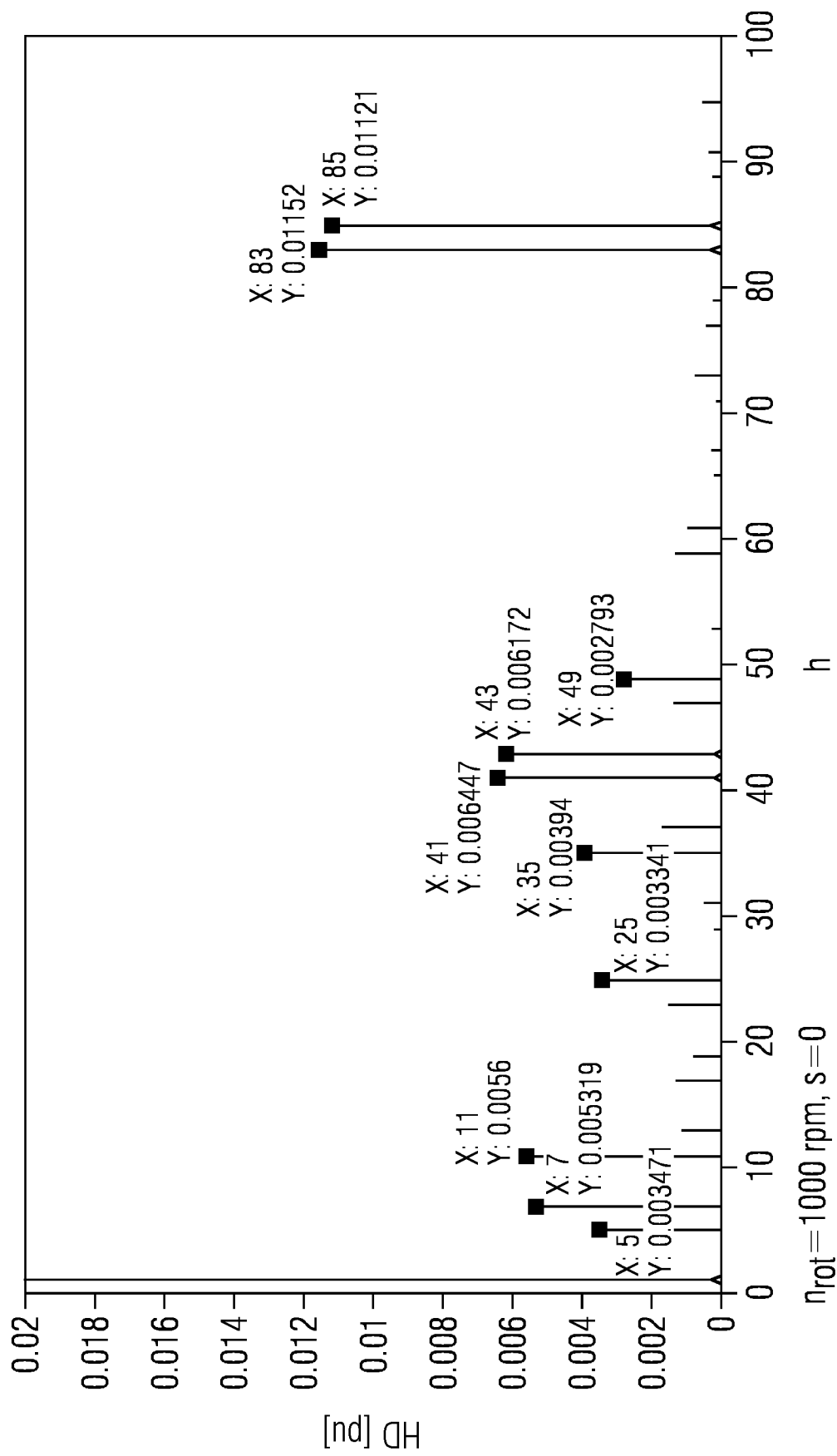
FIG. 8 illustrates harmonic distortions occurring during operation at a rated rotational speed set in accordance with embodiments of the invention.
Figure 9:
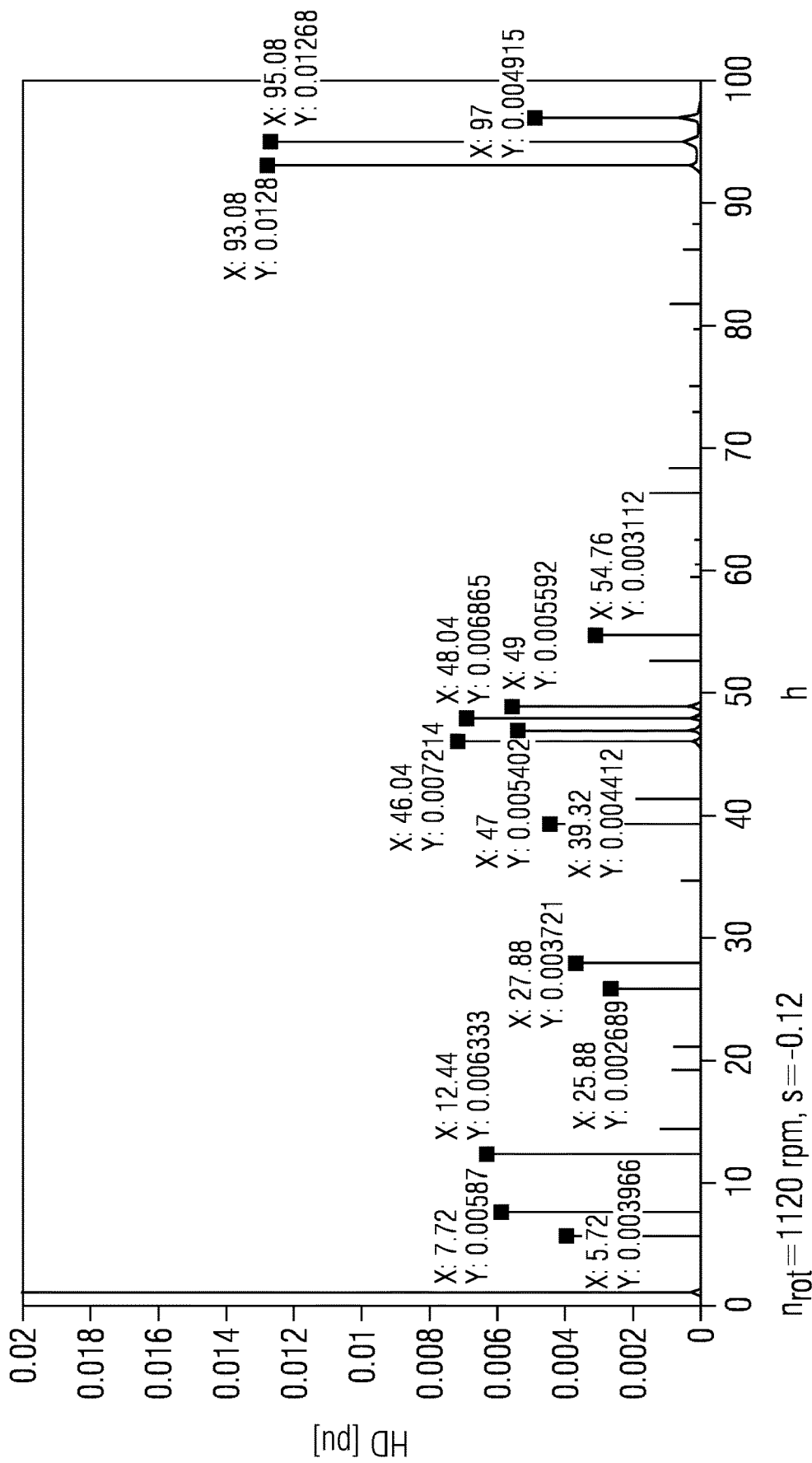
FIG. 9 illustrates inter-harmonic distortions occurring during operation at an arbitrarily selected rated rotational speed.
Figure 10:
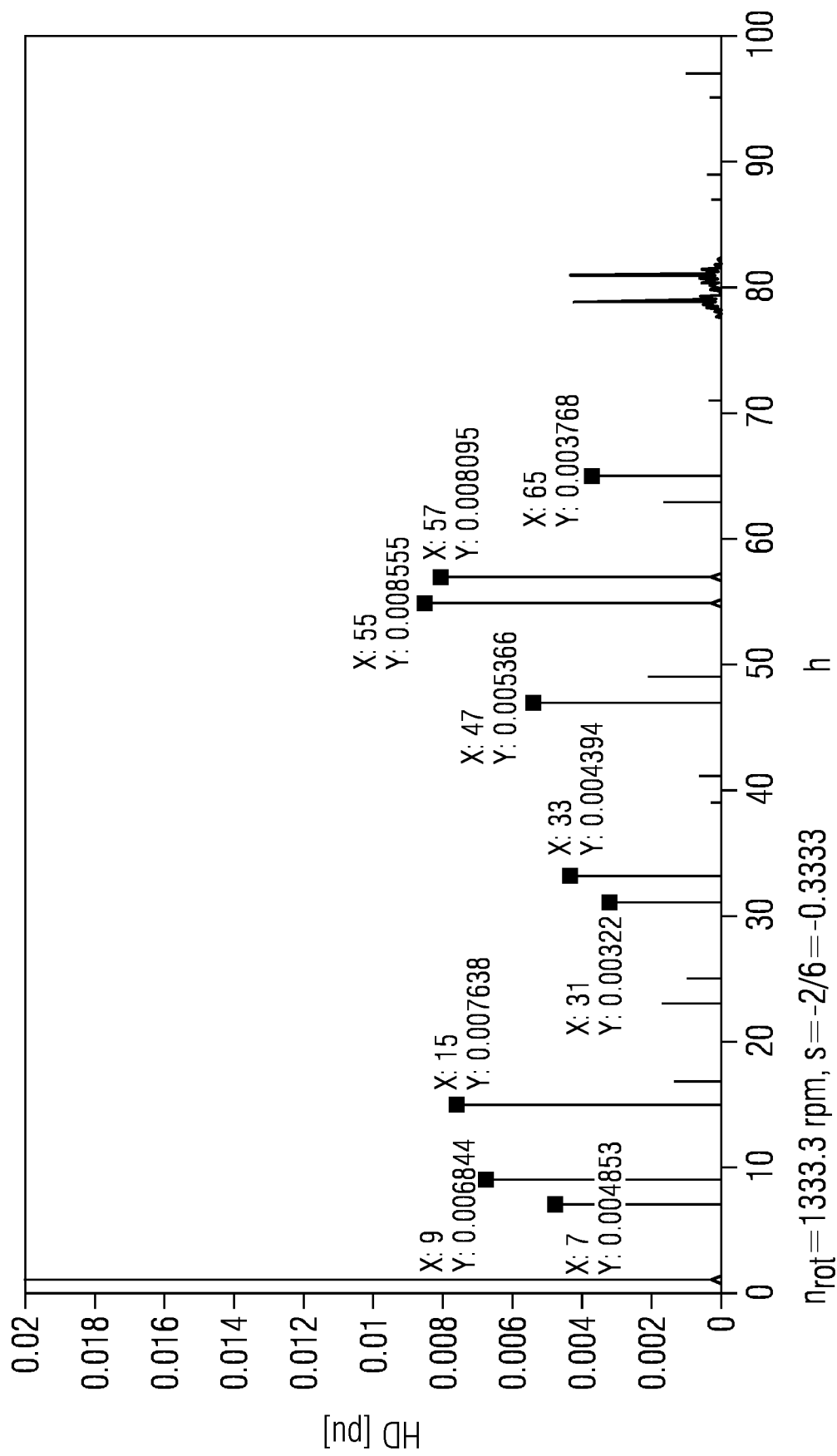
FIG. 10 illustrates harmonic distortions occurring during operation at a rated rotational speed set in accordance with embodiments of the invention.
Figure 11:
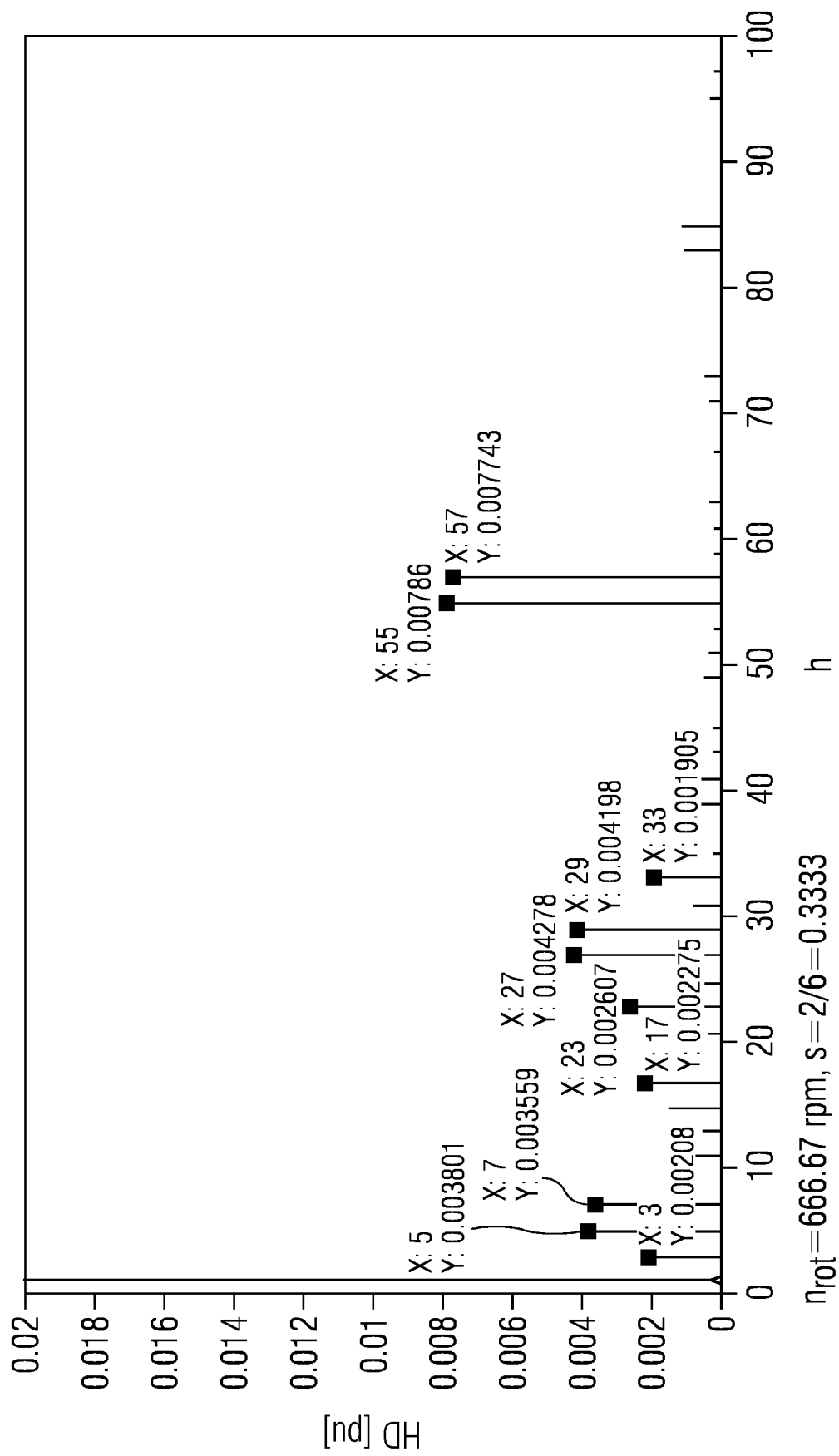
FIG. 11 illustrates harmonic distortions occurring during operation at a rated rotational speed set in accordance with embodiments of the invention.

The figures plot Stator Voltage Harmonic (or Inter-harmonic) Distortion $HD=V_h/V_0$ versus the harmonic/inter-harmonic order $h=f_h/f_0$. As indicated above, at the synchronous speed (s=0), all the slot harmonics are integer and odd (FIGS. 4 and 8). When the generator speed deviates from the synchronous speed, the slot harmonic shift and the harmonic order become non-integer, i.e., harmonics become inter-harmonics. For instance, for a slip of s=−0.12, the change of the order of the harmonic distortions is (please see FIGS. 5 and 9; i=+/−1):

$$h(s = 0) = 5 \quad h(s = 0) + 1 = 6 \quad \rightarrow \quad h(s = -0.12) = 5.72$$
$$h(s = 0) = 7 \quad h(s = 0) - 1 = 6 \quad \rightarrow \quad h(s = -0.12) = 7.72$$
$$h(s = 0) = 11 \quad h(s = 0) + 1 = 12 \quad \rightarrow \quad h(s = -0.12) = 12.44$$
$$h(s = 0) = 13 \quad h(s = 0) - 1 = 12 \quad \rightarrow \quad h(s = -0.12) = 14.44$$
...

i.e., the distortions become inter-harmonics. When the slip is now set to an integer multiple of the fraction F in accordance with the condition provided above, e.g., s=−⅙, the harmonic order is shifted as follows (please see FIG. 6):

$$h(s = 0) = 5 \quad h(s = 0) + 1 = 6 \quad \rightarrow \quad h(s = -1/6) = 6$$
$$h(s = 0) = 7 \quad h(s = 0) - 1 = 6 \quad \rightarrow \quad h(s = -1/6) = 8$$
$$h(s = 0) = 11 \quad h(s = 0) + 1 = 12 \quad \rightarrow \quad h(s = -1/6) = 13$$
$$h(s = 0) = 13 \quad h(s = 0) - 1 = 12 \quad \rightarrow \quad h(s = -1/6) = 15$$
...

Accordingly, the distortions are again harmonic distortions for such slip (i.e., at the respective rotational speed). When the slip is set to s=−2/6=−⅓, the harmonics are (please see FIG. 10)

$$h(s = 0) = 5 \quad h(s = 0) + 1 = 6 \quad \rightarrow \quad h(s = -1/3) = 7$$
$$h(s = 0) = 7 \quad h(s = 0) - 1 = 6 \quad \rightarrow \quad h(s = -1/3) = 9$$
$$h(s = 0) = 11 \quad h(s = 0) + 1 = 12 \quad \rightarrow \quad h(s = -1/3) = 15$$
$$h(s = 0) = 13 \quad h(s = 0) - 1 = 12 \quad \rightarrow \quad h(s = -1/3) = 17$$
...

Again, the order of the harmonic distortions is shifted by an integer number, so that no inter-harmonic distortions are present. Similar shift occurs when the machine operates in a sub-synchronous operating mode (i.e., $n_{rot} < n_{sync}$, positive slip). The order of the harmonic is decreased in such operation. When the slip is s=⅙, the order of the harmonic distortions is shifted as follows (please see FIG. 7):

$$h(s = 0) = 5 \quad h(s = 0) + 1 = 6 \quad \rightarrow \quad h(s = 1/6) = 4$$
$$h(s = 0) = 7 \quad h(s = 0) - 1 = 6 \quad \rightarrow \quad h(s = 1/6) = 6$$

-continued $$h(s=0)=11 \quad h(s=0)+1=12 \quad \rightarrow \quad h(s=1/6)=9$$

$$h(s=0)=13 \quad h(s=0)-1=12 \quad \rightarrow \quad h(s=1/6)=11$$

...

Again, only integer order distortions are obtained and thus no inter-harmonics. When the slip is set to be s=2*⅙=⅓, the shift of the harmonic order is (please see FIG. 11):

$$h(s=0)=5 \quad h(s=0)+1=6 \quad \rightarrow \quad h(s=1/3)=3$$

$$h(s=0)=7 \quad h(s=0)-1=6 \quad \rightarrow \quad h(s=1/3)=5$$

$$h(s=0)=11 \quad h(s=0)+1=12 \quad \rightarrow \quad h(s=1/3)=7$$

$$h(s=0)=13 \quad h(s=0)-1=12 \quad \rightarrow \quad h(s=1/3)=9$$

...

As illustrated by the above examples, the order of the harmonic distortions occurring at synchronous rotational speed can be shifted by an integer number (in either direction), which sets a condition for possible slip values and thus values of rotational speed. By setting the rated rotational speed of the DFIM, in particular the DFIG 20, to respective values, only harmonic distortions are obtained, which are either acceptable for the grid operator or can be removed by standard mitigation techniques. The present solution may in particular be used in combination with standard harmonic cancellation design techniques such as the selection of the stator and rotor number of slots, short pitching and slot skewing. By ensuring stator harmonic content of the DFIM that is easily cancelled by conventional techniques, additional hardware elements like passive or active harmonic filters are not required.

The condition that the order of the harmonic distortions is shifted by an integer number accordingly allows the derivation of numbers for the slip (and thus of the rotational speed) at which this condition is fulfilled. The rotational speed of the DFIM can be calculated using this condition and the above equations to $$n_c = 60*(1 \pm k*F)*f/p \quad \text{(equation 4)}$$

wherein $n_c$ (in units of rpm) is the rotational speed for which the condition is fulfilled, k is an integer number, F is the predetermined fraction that depends on the rotor symmetry, f is the grid frequency and p the pole pair number. As indicated above, F=1/(2*m) when m is odd, e.g., ⅙ for a three-phase machine and F=1/m when m is even, e.g., ⅙ for a six-phase machine. For concentrated winding, F=p/Q, and for fractional windings, F=p/R, as explained in detail above. The factor 60 originates from the conversion to units of rpm. Accordingly, by setting the rated rotational speed and in some embodiments the connection speed of the DFIM to a value of $n_c$, the generation of inter-harmonic distortions can be prevented at the maximum rated speed or the connection speed. By varying the number k, the speed can be set close to the desired rated speed. If k is set to an even number, the slot harmonics remain of an odd order.

For example, for 50 Hz grid frequency, p=3 pairs of poles machines, and 1000 rpm synchronous operation, the possible rotational speeds are 166.67, 333.33, 500, 666.67 and 833.33 rpm (sub-synchronous operation); and 1166.67, 1333.33, 1500, 1666.67, and 1833.33 rpm (super-synchronous or hyper-synchronous operation). For a 50 Hz grid, p=2 pairs of poles machines with a synchronous operation at 1500 rpm, the possible rotational speeds are 250, 500, 750, 1000 and 1250 rpm (sub-synchronous operation); and 1750, 2000, 2250, 2500 and 2750 rpm (super-synchronous or hyper-synchronous operation). For a 60 Hz grid, p=3 pairs of poles machines with 1200 rpm synchronous operation, the possible rotational speeds are 200, 400, 600, 800 and 1000 rpm (sub-synchronous operation); and 1400, 1600, 1800, 2000 and 2200 rpm (super-synchronous or hyper-synchronous operation). These numbers can be adjusted for electrical machines with different number of poles pairs and different operating frequency.

Figure 12:
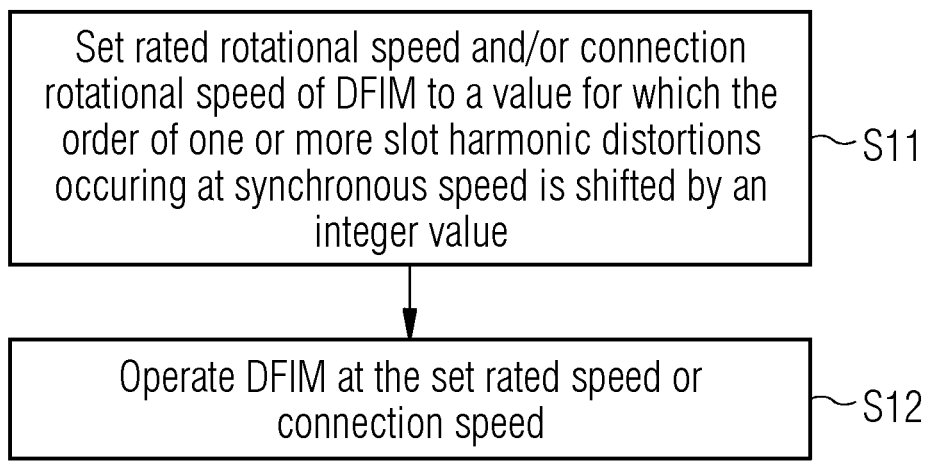
FIG. 12 is a flow diagram illustrating a method of controlling the operation of a doubly fed induction machine in accordance with an embodiment of the invention.

FIG. 12 is a flow-diagram of a method according to an embodiment. In step S11, the (maximum) rated rotational speed $n_r$ of the DFIM and in some embodiments also the connection rotational speed of the DFIM is set to a value for which the order of one or more slot harmonic distortions that occur at a synchronous rotational speed is shifted by an integer value. In step S12, the DFIM is operated at the set rated rotational speed or the set connection rotational speed. It should be clear that the rated rotational speed may be pre-configured in the control system, for example during manufacture or the like, so that the setting step S11 does not necessarily need to form part of the method. It should further be clear that the operation step S12 may comprise operation in accordance with the operating curve 200 of FIG. 2, wherein the rated rotational speed 202 and in some embodiments the connection rotational speed 201 is set in accordance with the solution disclosed herein. The operation may thus include the operation in a first operating mode or operating regime indicated by the curve section 201, a second operating mode or operating regime at variable generator speed between the curve sections 201 and 202 and a third operating mode or operating regime defined by the curve section 202, i.e., the rated rotational speed. The operating point on curve 200 is controlled by control system 10 based on the prevailing conditions, in particular based on the available mechanical torque or the available wind speeds.

The solution disclosed herein allows operation of a wind turbine 100 or of a wind farm that uses DFIGs without installation of additional harmonic filters or active cancellation devices. The generator speed or slip is adjusted such that the distortions are shifted to integer order harmonics, in particular by fulfillment of the conditions laid out above. As the regulatory requirements for such harmonic distortions are lower, the need for additional filters or cancellation systems is reduced. Inter-harmonic emission limits can thereby be fulfilled in a simple and cost-efficient way. The solution disclosed herein is also applicable to other types of DFIMs, such as induction motors, for example in mines, such as motors of mills, conveyors, in the paper industry or the like.

In some situations, the limits for even integer order harmonics are also rather strict. In such cases, standard cancellation techniques can be employed in addition to the above solution, which allows an efficient mitigation of such harmonic distortions. Standard design techniques, such as slot skew by one slot, can be used. In the part of the operating curve in which the speed of the generator is allowed to change, inter-harmonic distortions can occur. However, due to the dynamic operation and the continuously varying speed, these inter-harmonics do not occur at pre-defined frequencies but are scattered throughout the spectrum. Consequently, the inter-harmonic current levels are reduced significantly, so that such inter-harmonics do not noticeably deteriorate the power quality.

It is also conceivable to employ the solution disclosed herein at other predefined operating speeds of the DFIM. For example, the rated speed may be modified by a low acoustic noise-operating mode (LANM) of a wind turbine, which reduces the rated speed in order to reduce noise generation. Also, for the rated speed of such operating mode, the rotational speed may be determined and set such that the above outlined conditions are fulfilled, i.e., such that the order of the harmonic distortions is shifted by an integer number. Consequently, also during such operation, the emission of inter-harmonic distortions can be reduced significantly or even be avoided.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an operation of a doubly fed induction machine (DFIM), wherein the DFIM includes a stator electrically coupled to a power grid and a rotor rotating with a rotational speed, and wherein the DFIM has a synchronous rotational speed of the rotor and a rated rotational speed of the rotor, wherein rotation of the rotor at the synchronous rotational speed generates one or more slot harmonic distortions having a harmonic order, the method comprising:
   operating the DFIM at the rated rotational speed of the rotor, wherein the rated rotational speed of the rotor is set to a value selected such that a shift of the harmonic order of one or more of the slot harmonic distortions at the rated rotational speed of the rotor is an integer number or is within a predefined limit of an integer number;
   wherein a slip of the rotor is defined in dependence on a difference between the synchronous rotational speed ($n_{sync}$) of the rotor and the rotational speed ($n_{rot}$) of the rotor, wherein the rated rotational speed of the rotor is set by setting the slip at the rated rotational speed of the rotor to a predetermined value;
   wherein the rated rotational speed of the rotor is set to a value $n_r$ in units of rpm determined by the equation $n_r=60*(1\pm k*F)*f/p$, wherein k is an integer, F is a predetermined fraction determined by a symmetry of the rotor, f is the grid frequency and p is the pole pair number of the rotor.

2. The method according to claim 1, wherein the slip s is defined as $s=1-(n_{rot}/n_{sync})$, wherein $n_{rot}$ is the rotational speed of the rotor and $n_{sync}$ is the synchronous rotational speed.

3. The method according to claim 1, wherein the predetermined value of the slip at the rated rotational speed of the rotor is set to be an integer multiple of a predetermined fraction, wherein the predetermined fraction is determined by a symmetry of the rotor.

4. The method according to claim 3, wherein for an odd number of phases of the DFIM, the predetermined fraction is $1/(2*m)$, and/or wherein for an even number of phases of the DFIM, the predetermined fraction is $1/m$, wherein m is the number of phases of the DFIM.

5. The method according to claim 3, wherein the DFIM has concentrated rotor coils, wherein the predetermined fraction is p/Q, wherein p is the number of pole pairs of the rotor and Q is the total number of concentrates coils of the rotor.

6. The method according to claim 3, wherein the DFIM has fractional rotor windings, wherein the predetermined fraction is p/R, wherein R is the remainder of a division between Z and (2*p*m), wherein Z is the total number of rotor slots, p is the number of pole pairs of the rotor, and m is the number of phases of the rotor.

7. The method according to claim 1, wherein the DFIM is a doubly fed induction generator (DFIG), wherein the rated rotational speed of the rotor is a maximum rated rotational speed of the rotor, wherein the DFIG is controlled so that upon reaching the rated rotational speed, the rotational speed of the rotor is keep at the rated rotational speed of the rotor when the active electrical power output of the DFIG increases.

8. The method according to claim 1, wherein the DFIM is a doubly fed induction generator, DFIG, wherein the DFIG further has a connection rotational speed at which the DFIG starts providing active electrical power towards the power grid, wherein the method further comprising:
   setting the connection rotational speed of the rotor to a value selected such that a shift of the harmonic order of one or more of the slot harmonic distortions at the connection rotational speed of the rotor is an integer number or is within a predefined limit of an integer number.

9. The method according to claim 1, wherein the DFIM has a slot skew of one or more slots in the stator and/or the rotor, an integer number of slots, one slot, and/or wherein the DFIM has a coil pitch shortening of one or more slots in the stator and/or in the rotor.

10. The method according to claim 1, wherein the method further comprising:
    operating the DFIM in a noise reduction mode of operation in which the rated rotational speed is reduced to a second rated rotational speed; and
    setting the second rated rotational speed of the rotor to a value selected such that a shift of the harmonic order of one or more of the slot harmonic distortions at the second rated rotational speed of the rotor is an integer number or is within a predefined limit of an integer number.

11. The method according to claim 1, wherein the DFIM is a doubly fed induction generator, DFIG, wherein the DFIG forms part of an electrical power system of a wind turbine, wherein the rotor of the DFIG is mechanically coupled to a wind turbine rotor to receive rotational mechanical energy from the wind turbine rotor.

12. A control system for controlling the operation of a doubly fed induction machine (DFIM), wherein the DFIM includes a stator configured to be electrically coupled to a power grid and a rotor configured to rotate with a rotational speed, and wherein the DFIM has a synchronous rotational speed of the rotor and a rated rotational speed of the rotor, wherein rotation of the rotor at the synchronous rotational speed generates slot harmonic distortions having a harmonic order,
    wherein the control system is configured to perform the step of operating the DFIM at the rated rotational speed of the rotor, wherein the rated rotational speed of the rotor is set to a value selected such that a shift of the harmonic order of one or more of the slot harmonic distortions at the rated rotational speed of the rotor is an integer number or is within a predefined limit of an integer number;

wherein a slip of the rotor is defined in dependence on a difference between the synchronous rotational speed ($n_{sync}$) of the rotor and the rotational speed ($n_{rot}$) of the rotor, wherein the rated rotational speed of the rotor is set by setting the slip at the rated rotational speed of the rotor to a predetermined value;

wherein the rated rotational speed of the rotor is set to a value $n_r$ in units of rpm determined by the equation $n_r=60*(1+k*F)*f/p$, wherein k is an integer, F is a predetermined fraction determined by a symmetry of the rotor, f is the grid frequency and p is the pole pair number of the rotor.

13. A wind turbine comprising a doubly fed induction machine in form of a doubly fed induction generator, DFIG, and a control system according to claim 12, wherein the control system is coupled to the DFIG to control the operation of the DFIG.

14. A computer program product, comprising a computer readable hardware storage device having computer readable program code stored therein, said program code executable by a processor of a computer system to implement a method of claim 1.

\* \* \* \* \*